Dec. 10, 1940.    K. IDE ET AL    2,224,683
FEEDING METHOD AND ARTICLE
Filed April 27, 1938
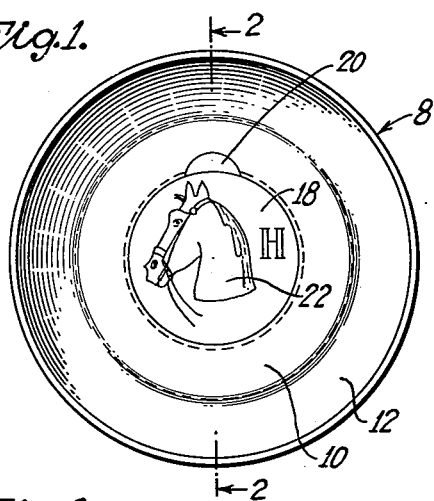
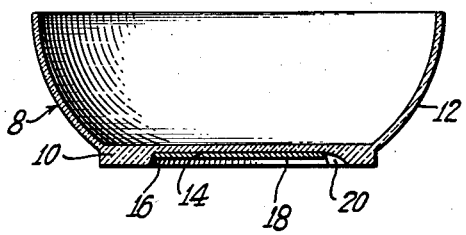
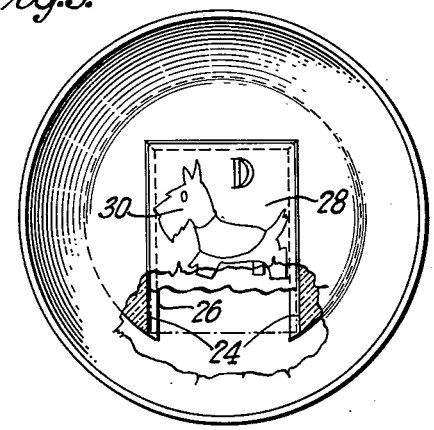
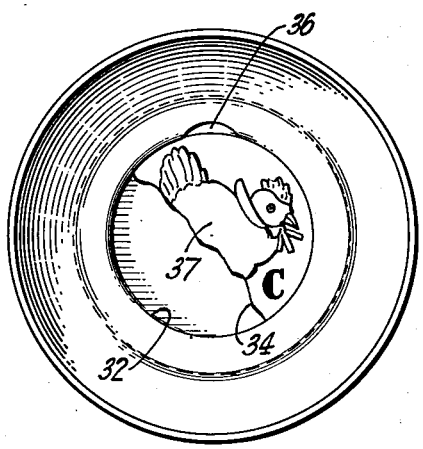
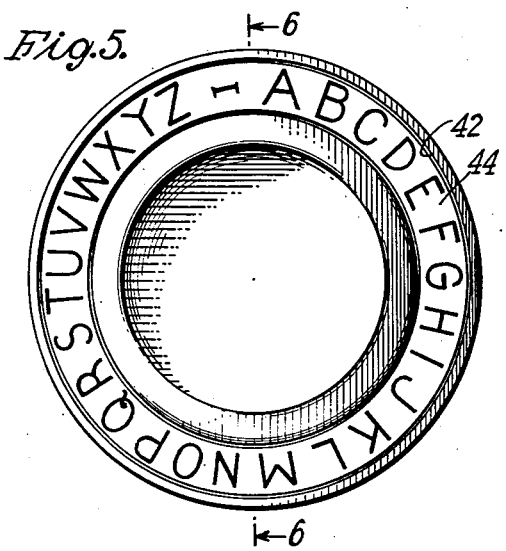
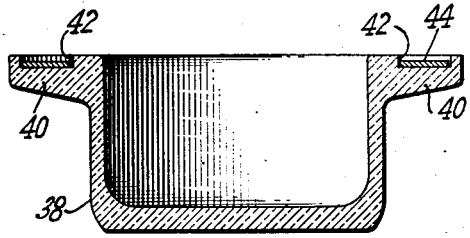
INVENTORS
KNOX IDE
GEORGE S. HILLS
BY John M. Leach
ATTORNEY Patented Dec. 10, 1940

2,224,683

UNITED STATES PATENT OFFICE 2,224,683

FEEDING METHOD AND ARTICLE

Knox Ide, Jersey City, N. J., and George S. Hills, New Rochelle, N. Y.

Application April 27, 1938, Serial No. 204,530

2 Claims. (Cl. 65—15)

The present invention relates to a method and article for feeding juveniles. More particularly, it relates to a method of inducing juveniles to partake of nourishment and utensils for containing foods and beverages, such as plates, bowls, cups, and glasses having amusement or educational features associated therewith, for use in carrying out the method.

Nourishment receptacles heretofore used in the feeding of children, when decorated at all, have had the decorations permanently associated therewith, with the result that the child soon becomes familiar with the decoration and loses all interest in it. Also, decorations which are so permanently associated with the utensil become obliterated due to washing and cleaning unless the utensil is made of high-grade china which will take firing sufficiently to insure the permanency of the decoration. This has caused utensils of this type to be prohibitively expensive since such utensils are always subject to breakage on the part of the child.

It is an object of the present invention to provide a method of inducing juveniles to partake of nourishment.

It is a further object of the present invention to provide a decorated container or utensil for foods and beverages.

It is a further object of the invention to provide a decorated container for foods and beverages having educational and amusement features.

It is a further object of the invention to provide a decorated utensil for food or beverages having replaceable educational or amusement features.

It is a further object of the invention to provide an eating or drinking utensil or receptacle having provision for carrying replaceable pictures, prints, etc., and which is sanitary and capable of being easily cleaned and sterilized without injury to the decorative or educational feature.

It is a further object of the invention to provide an eating or drinking receptacle which can be employed with various serial type educational and/or amusement features.

Other objects and advantages, if not specifically pointed out, will be apparent to those skilled in the art upon recourse to the following detailed description of what are now considered the preferred forms of the invention.

In the drawing:

Fig. 1 is a top-plan view of a child's bowl constructed in accordance with the invention;

Fig. 2 is a central vertical cross-sectional view taken substantially on the plane indicated by line 2—2 of Fig. 1;

Fig. 3 is a top-plan view of a modified form of the bowl illustrated in Fig. 1;

Fig. 4 is a top-plan view of another modified form of the invention;

Fig. 5 is a top-plan view of a further modified form of the invention, and

Fig. 6 is a central vertical sectional view taken substantially on the plane indicated by line 6—6 of Fig. 5.

Referring to Figs. 1 and 2, the eating utensil comprises a dished container or bowl 8 which may be formed of glass, natural or synthetic resin, or other moldable plastic or similar material. It is important that the bottom section 10 of the bowl be formed of some translucid, preferably transparent, material in order that articles placed beneath the bottom section 10 will be visible therethrough. The side walls 12 of the bowl may be formed of either transparent or opaque material, as desired, and may be provided with any desired decorative treatment. The shape of the bowl shown in Figs. 1 and 2 is intended merely to provide an example of forms which the bowl may take and the bowl may be given any desired configuration. It is not necessary that the container be made in the shape of a bowl, but it may be formed as a cup, glass, plate, etc.

The bottom section 10 of the bowl is provided, at its underneath portion, with a recess 14 which extends any desired distance into the bottom section. The side wall of the recess is given a slight bevel as shown at 16 for a purpose which will be later described.

A plate 18, which has been shown as a disk but which may be square, oblong or any other desired shape, is made of a size such that when it is gently pressed into the recess 14 it will seat snugly into position and be retained in the recess solely by frictional contact between its periphery and the side-walls of the recess.

The plate 18 may be made of chipboard, fiberboard, Celluloid, metal, wood, or any other desired material which will give it sufficient rigidity to be held in position within the recess by frictional contact substantially without being distorted.

A niche 20 is formed in the side wall of the recess to enable a fingernail or some sharp pointed instrument to be inserted beneath the plate 18 to dislodge it from the recess.

The plate 18 is provided preferably on its top surface with a figure 22. The figure 22 may be in the form of a picture, print, map or any other desired design. In addition, the print may contain any desired symbol, for example, a letter of the alphabet corresponding to the first letter of the name of the object depicted by the design. In the example given the picture is that of a horse and it also carries the letter H. Throughout the specification and claims the term "design" will be used to denote any of the foregoing enumerated types of design or any other desired design.

The design may be applied to the plate 18 by photolithographic processes, decalcomania processes, off-set printing, hand painting, embossing, engraving or any other of the well-known methods of forming designs.

The modification of the invention illustrated in Fig. 3 differs from that shown in Figs. 1 and 2 in that the recess 14 is supplanted by a slot 24 opening into the base of the utensil or receptacle from the side. The bottom of the slot may be cut out as shown at 26 to facilitate cleaning of the receptacle, but this is not necessary if it is desired that the bottom be solid.

A slide 28, which corresponds to the plate shown in Figs. 1 and 2, is slipped into position from the open side of the slot, and the slide may be provided with any desired design 30 corresponding to the design 22 of the modification shown in Figs. 1 and 2. In the illustrated example the design is a picture of a dog accompanied by the letter D.

The modified form of the utensil illustrated in Fig. 4 differs from that shown in Figs. 1 and 2 in that a recess 32, corresponding to the recess 14, is formed in the top portion of the bottom section of the bowl. A plate 34 bearing a design 37 is snugly seated in position in the recess 32 and retained therein by frictional contact between the periphery of the plate and the side wall of the recess. The side wall of the recess in this modification is also provided with one or more niches 36 to enable the plate 34 to be easily removed. In the example shown in Fig. 4 the design 37 is a picture of a chicken and it is accompanied by the letter C.

The modification illlustrated in Figs. 5 and 6 comprises a bowl or other container 38 which may be formed of any desired material and is provided with a flange around its periphery, preferably near the upper portion of the bowl. The flange 40 has formed therein an annular recess 42 which receives an annular plate 44.

The plate 44 may be provided with any desired design, for example, the entire alphabet, as disclosed. Annular plate 44 may be made slightly smaller than the recess 42 so that the plate may be rotated within the recess by light finger pressure.

The decorated utensil of the present invention can be advantageously used in connection with the feeding of juveniles. To this end, a series of plates may be employed, each of which bears a design in which the child will be interested and may be used in an educational way by associating educational features with the designs. For example, a series of plates may be provided, each of which bears one letter of the alphabet and some identifying picture, for example the plate bearing the letter A can have a picture of an apple associated therewith and so on through the alphabet. The series of plates and the cooperative food or beverage container form an attractive and useful juvenile feeding set.

In the practice of the method of the invention, a plate bearing a design in which it is known that the child will be interested is inserted in position in the recess of the container and the container is filled with the food comprising the nourishment for a feeding period. The child is then told that there is a picture beneath the food which he would enjoy seeing but which he cannot see until all of the food is eaten. This has been found to be effective in inducing children to partake willingly of all of their nourishment at times when they would otherwise refuse their food or eat it reluctantly. When the child consumes the nourishment he then sees the picture and may be told any story in connection therewith that the attendant sees fit. He may also be told that he will be permitted to see another picture at his next feeding period, thereby creating an air of expectancy on the part of the child and encouraging him to partake of his nourishment in a way which does not impress upon him the fact that he is being encouraged to eat his food. This places the child in a mental state such that he derives the greatest benefit from his food in addition to the pleasure also obtained.

When the meal has been completed the plate may be readily removed from the recess in the container by inserting a fingernail in one of the niches, when the modification shown in Figs. 1, 2 and 4 is used, by sliding the plate out of the slot when the modification illustrated in Fig. 3 is used or by up-turning the receptacle and gently tapping the plate out of the recess when the modification shown in Figs. 5 and 6 is used.

The container then can be thoroughly washed and sterilized by boiling without damaging the design.

In each of the modifications of the invention disclosed there is always at least one surface of the design-bearing plates, such as a face or an edge, exposed to facilitate removal of the plate.

In using the modified form of the invention illustrated in Figs. 1 to 3, inclusive, it is possible to place the plate in the recess with the design facing downwardly. It is then necessary for the child to consume all of the food before the bowl can be turned upsidedown so that he can see the picture, and he is thereby prevented from pushing the last portion of the food to one side in order to see the picture before he has eaten all of the food.

In the modified form of the invention illustrated in Fig. 4 wherein the design is in contact with the food, it is preferable that the design be made water-proof, for example, by placing a coating of water-proof lacquer over the entire face of the design.

When using the modified form of the invention illustrated in Figs. 5 and 6, the plate 44 is placed within the recess 42 so that the first character of the series comprising the design is in position to be observed by the child. This character is then explained to him and if desired he may be told a story in regard to the character, and the plate 44 is then revolved so that the next character of the design in order can be observed by him. The character is explained as before. This is repeated throughout the entire series and while the child's attention is thus occupied he is induced to consume his food without appreciating that such is taking place.

The letters of the alphabet have been illustrated as a design for the plate 44 as an exemplification and the letters may be replaced by other characters, for example, fictitious persons, animals, characters from fairy tales, etc.

The foregoing details have been given for the purpose of explanation and not limitation, since many changes may be made in the physical embodiments and the method disclosed without departing from the spirit of the invention which is to be limited only by the appended claims.

Having described the invention, what is claimed is:

1. A nourishment container comprising a bowl shaped body having a bottom section formed of transparent material, said bottom section being provided with a recess having a substantially straight and bevelled sidewall extending from the underneath side of said bottom section to a point beneath the top side thereof, a plate removably disposed within said recess and retained therein without distortion solely by frictional contact of the periphery with said sidewall, and a design carried by the top portion of said plate.

2. A nourishment container comprising a dished receptacle formed of translucid material and having a recess extending upwardly from the lower surface of the bottom section thereof having a substantially straight sidewall which does not extend entirely through the bottom section and is slightly bevelled, a plate snugly disposed within said recess and retained therein without distortion from its normal shape solely by frictional contact between the periphery of said plate and the wall of said recess, and a design carried by the upper surface of said plate.

KNOX IDE.
GEORGE S. HILLS.